(No Model.)

E. C. CARTER.
SWITCH AND SIGNAL CONNECTION.

No. 599,492. Patented Feb. 22, 1898.

Witnesses.
Wm. M. Rheem.
Wm. S. Bates

Inventor
Edw. C. Carter.

THE NORRIS PETERS CO., PHOTO-LITHO., WASHINGTON, D. C.

UNITED STATES PATENT OFFICE.

EDWARD C. CARTER, OF CHICAGO, ILLINOIS.

SWITCH AND SIGNAL CONNECTION.

SPECIFICATION forming part of Letters Patent No. 599,492, dated February 22, 1898.

Application filed July 19, 1897. Serial No. 645,112. (No model.)

*To all whom it may concern:*

Be it known that I, EDWARD C. CARTER, of Chicago, Illinois, have invented certain new and useful Improvements in Switch and Signal Connections, whereof the following is a specification.

My invention relates to connections for switches and signals which are operated from a point some distance from them. These devices are commonly operated by means of rods formed of tubing, connecting them with a lever or other device at the point where the operator is stationed. Heretofore the sections of tubing have been connected together by means of screw-couplings screwed onto their ends, with plugs inside and then riveted through. This form of connection is expensive and interferes with the rod-carriers, necessitating considerable planing and cutting of the tubes to bring the couplings at points between the rod-carriers.

My invention consists in combining the tubes with notched plugs inserted in their adjacent ends and then striking down the metal of the tubes into the notches, so as to form lips or projections, which enter the notches and lock the tubes and plugs together.

In the accompanying drawings I have shown my invention in what I consider its best form.

Figure 1:
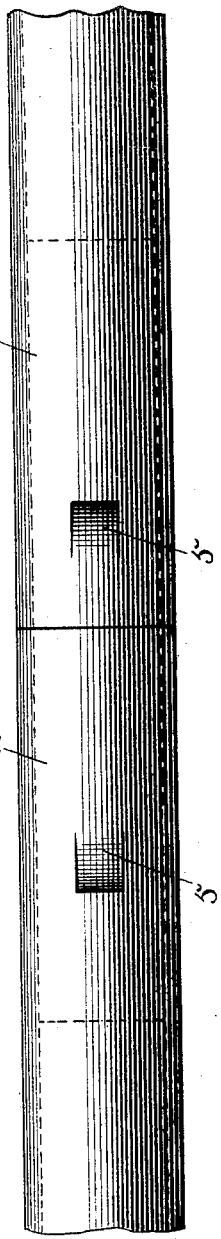
Figure 2:
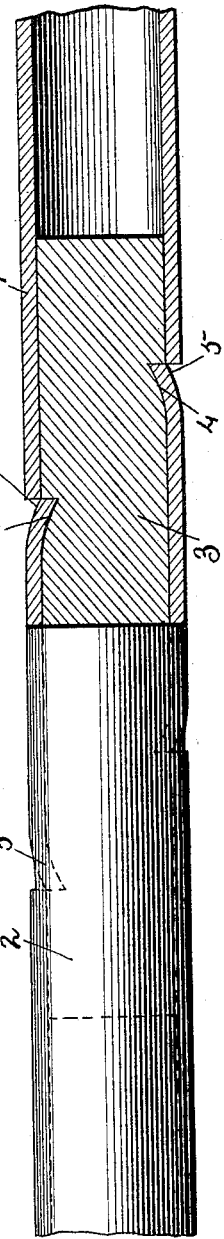

Figure 1 is a longitudinal elevation showing the adjacent ends of two coupled tubes. Fig. 2 is a similar elevation at right angles to Fig. 1 and partly in section.

On the drawings, 1 is a tube, and 2 is the adjacent tube connected to it. 3 is a plug, preferably of wrought-iron, provided with notches 4, one or more for each tube. 5 are lips or projections struck into the notches from the metal of the tubes, thus securely locking the two tubes and the plug together. This makes a strong flush joint which does not interfere with the sliding of the tubes through the carrier and can be made quickly and cheaply. It, moreover, develops over seventy-five per cent. of the full strength of the tubing, where a screw-coupling develops less than fifty per cent. by reason of the reduction of the sectional area due to cutting the threads.

It is obvious that the structure described may be variously modified without departing from the invention.

I claim—

1. The combination with the tubes of a notched plug entering adjacent tubes, and lips or projections struck from the metal of the tubes and engaging the notches therein substantially as set forth.

2. The combination with the tubes of a solid notched plug entering adjacent tubes, and lips or projections struck from the metal of the tubes and engaging the notches therein substantially as set forth.

EDWD. C. CARTER.

Witnesses:
WM. S. BATES,
L. W. STRONG.